United States Patent [19]
Trikha et al.

[11] Patent Number: 6,072,993
[45] Date of Patent: *Jun. 6, 2000

[54] PORTABLE RADIO TRANSCEIVER WITH DIPLEXER-SWITCH CIRCUIT FOR DUAL FREQUENCY BAND OPERATION

[75] Inventors: Pushp Kumar Trikha, La Jolla; Roger William Berg, Carlsbad, both of Calif.

[73] Assignees: Sony Corporation, Tokyo, Japan; Sony Electronics, Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/909,744

[22] Filed: Aug. 12, 1997

[51] Int. Cl.$^7$ .............................. H04B 1/44; H04B 1/06; H04B 1/034; H01Q 11/12
[52] U.S. Cl. ......................... 455/78; 455/277.1; 455/99; 455/345; 455/120; 455/121; 455/123; 455/193.1
[58] Field of Search ................................... 455/562, 552, 455/553, 550, 77, 74, 74.1, 73, 90, 575, 78, 84, 99, 345, 272, 80–82, 83, 86, 120, 121, 123, 129, 193.1, 277.1; 333/101, 103, 104

[56] References Cited

U.S. PATENT DOCUMENTS

| | | |
|---|---|---|
| 4,072,900 | 2/1978 | Ray ............................................ 455/74 |
| 4,656,364 | 4/1987 | Yokogawa et al. ................... 455/277.1 |
| 4,661,992 | 4/1987 | Garay et al. ........................... 455/90 X |
| 4,803,447 | 2/1989 | Schultz et al. ........................ 455/277.1 |
| 5,048,117 | 9/1991 | Aisaka et al. .............................. 455/90 |
| 5,261,121 | 11/1993 | Hashimoto .............................. 455/552 |
| 5,337,061 | 8/1994 | Pye et al. ................................. 343/702 |
| 5,574,987 | 11/1996 | Wallace ................................... 455/575 |
| 5,584,053 | 12/1996 | Kommrusch et al. .................... 455/83 |
| 5,594,394 | 1/1997 | Sasaki et al. ........................... 333/103 |
| 5,649,306 | 7/1997 | Vannatta et al. ........................ 455/575 |
| 5,659,888 | 8/1997 | Kato et al. ................................ 455/99 |
| 5,768,691 | 6/1998 | Matero et al. ............................. 455/78 |

*Primary Examiner*—Dwayne D. Bost
*Assistant Examiner*—Tracy M. Legree
*Attorney, Agent, or Firm*—Frommer Lawrence & Haug, LLP.; William S. Frommer

[57] ABSTRACT

A portable radio transceiver selectively transmits and/or receives RF signals in two frequency bands and in two modes of operation. The radio transceiver selectively switches between two antennas for operating in either of the two modes, such as a handheld mode of operation using the transceiver's on-board antenna and battery, or a car mode of operation using an external antenna and battery. Either antenna can transmit and/or receive RF signals in the two frequency bands, such as PCS and cellular, for example.

11 Claims, 7 Drawing Sheets

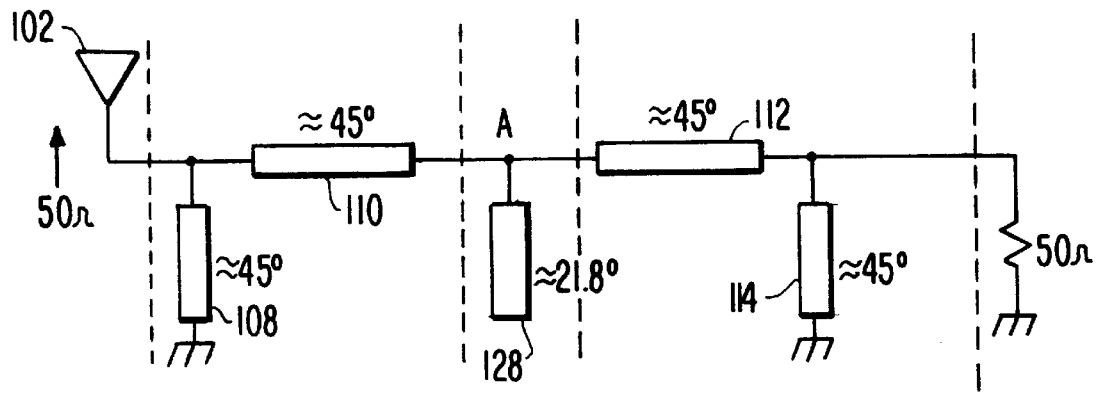
FIG. 5A
FIG. 5B
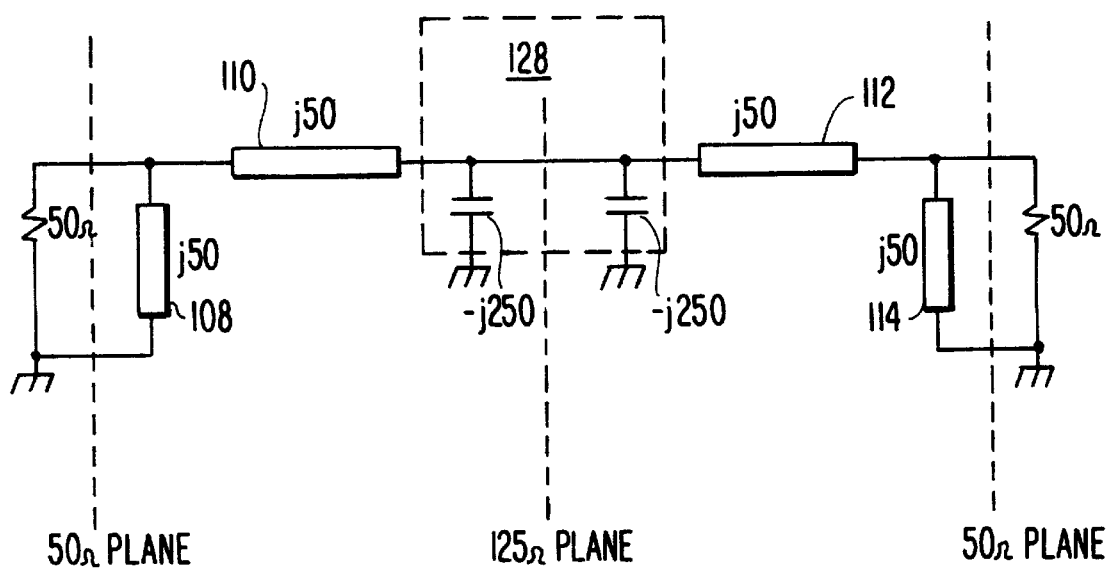

PORTABLE RADIO TRANSCEIVER WITH DIPLEXER-SWITCH CIRCUIT FOR DUAL FREQUENCY BAND OPERATION

BACKGROUND OF THE INVENTION

The present invention is related to wireless telecommunications equipment and, more specifically, to wireless telecommunications equipment, such as a telephone with two modes of operation (car and handheld), for use in a dual frequency band (Personal Communications Services and cellular frequencies).

With the proliferation of commercial wireless telecommunications services, it is only logical that a dual band wireless telephone is desirable by customers, and the user of the wireless telephone would like the flexibility of portable (handheld) operation for virtually limitless access to any calling party from any location. In addition, while in his or her car, for example, the user would like to connect this wireless telephone to the car antenna and operate it from the car battery in order not to utilize the nickel cadmium battery typically employed with cellular/PCS phones. This way, the telephone can be efficiently operated, while preventing a reduction in talk or standby time due to depleted charges of the nickel cadmium battery, for example.

Several problems, however, are generally encountered when switching between two antennas (car and handheld) in the dual-band operation. Any additional insertion loss, resulting from a series-connected switching device inserted for changing between the two operations, cannot be tolerated during the handheld operation. That is, if a closed switch exists in the series path between the antenna and the radio transceiver in the handheld operation, the insertion loss attributed to that switch increases the system noise figure, thereby decreasing the circuit sensitivity. Such a series inserted switch becomes prohibitive due to strict sensitivity requirements in the handheld operation.

In addition, the additional non-linearity from the series inserted switch could add to intermodulation and cross modulation problems (i.e., co-channel interference) in receiving applications. The switch could also cause spectral regrowth and increase adjacent channel power (i.e., adjacent channel interference) in transmitting applications. The non-linearity can be reduced by increasing a bias current to the switching device, but that would mean sacrificing the much needed talk and standby time due to additional power drawn from the handheld telephone battery.

The above problems are further exacerbated because the wireless phone is preferably operable in 2 frequency bands, namely PCS and cellular.

A need therefore exists for a system and method to overcome the above disadvantages.

OBJECTS OF THE INVENTION

It is an object of the present invention to provide a portable radio transceiver for operating in two frequency bands.

It is another object of the present invention to provide a portable radio transceiver for receiving/transmitting radio frequency (RF) signals via either its own antenna (handheld antenna) or via another antenna/port (car antenna) connected to the radio transceiver.

It is a further object of the present invention to provide a portable radio transceiver for operating in two frequency bands such that the radio transceiver receives/transmits RF signals via either its own antenna or via another antenna/port connected to the radio transceiver.

It is still another object of the present invention to provide a portable radio transceiver for operating in two frequency bands such that the radio transceiver receives/transmits RF signals via either its own antenna or via another antenna/port connected to the radio transceiver, without requiring additional current to overcome any added non-linearities into the transceiver circuit when using the handheld antenna.

SUMMARY OF THE INVENTION

These and other objects, features and advantages are accomplished by apparatus and method for selectively transmitting/receiving RF signals. In accordance with the present invention, a portable radio transceiver selectively transmits/receives RF signals in a first frequency band or a second frequency band. The RF signals are selectively transmitted/received via a first antenna or a second antenna. The radio transceiver includes a transmission circuit for carrying the RF signals to/from the first and second antennas. Further included is a plurality of switches for selectively switching reception/transmission of the RF signals between the first and second antennas. In addition, the radio transceiver has a tuning circuit that selectively presents the correct impedance to RF signals in each of the two frequency bands for signal reception/transmission carried out via the first or second antenna.

In accordance with one aspect of the invention, the tuning circuit selectively adjusts the impedance if the RF signals are in the first frequency band, without substantially affecting the reception/transmission of the RF signals in the second frequency band.

In accordance with another aspect of the invention, the first frequency band is allocated for Personal Communications Services, and the second frequency band is allocated for cellular services.

In accordance with yet another aspect of the invention, the switches are PIN diodes that are forward biased for a substantially short circuit operation and reverse biased for a substantially open circuit operation.

In accordance with still another aspect of the invention, the tuning circuit comprises at least one capacitor and quarter-wave length lines at the PCS frequency band.

BRIEF DESCRIPTION OF THE DRAWINGS

The above-mentioned as well as additional objects, features and advantages of the present invention will become readily apparent from the following detailed description thereof which is to be read in conjunction with the accompanying drawings, in which:

FIG. 5A is a block diagram of the RF equivalent circuit for transmitting and receiving cellular frequency signals from the car antenna using a distributed tuning element;

FIG. 5B is the same circuit as FIG. 5A showing a capacitive lumped tuning element;

In all Figures, like reference numerals represent the same or identical components of the present invention.

DETAILED DESCRIPTION OF THE PREFERRED EMBODIMENTS

As a general overview of the present invention, a wireless telephone operates in two frequency bands (PCS and cellular) using one of the two antennas (handheld or car). The telephone includes, among other things, a diplexer-switch circuit that allows the use of a second antenna (or a test port, for example) at the front end of a portable radio transceiver without introducing significant additional insertion loss, non-linearity and power requirements in the handheld mode. As a result, any reduction in talk or standby time is minimized in the wireless telephone, since no additional bias current is required or consumed during the handheld operation, according to the invention. Namely, the dual-band wireless transceiver application is cost-efficiently implemented without sacrificing signal strength or introducing signal non-linearity or distortion (i.e., co-channel or adjacent channel interference is negligible) that are caused in the prior art devices utilizing a series-connected switch.

It will be appreciated that two modes of operation are mentioned throughout the description of the invention: handheld and car. The handheld mode of operation is understood to mean the wireless telephone application in which the telephone uses its own (so-called "on-board") antenna and battery that are included in the telephone unit itself; while the car mode of operation is understood to mean the wireless telephone application in which the telephone uses other antenna and battery. One example of the car mode is a car kit that includes an adapter for connecting the wireless telephone to the car antenna for receiving cellular and/or PCS signals, and for connecting the telephone to the car battery for using it as a power source. Similarly, the "handheld antenna" refers to the antenna on the telephone unit itself, while the "car antenna" is the antenna other than the handheld antenna, such as the car antenna, for example, representatively used throughout the following description.

Figure 1:
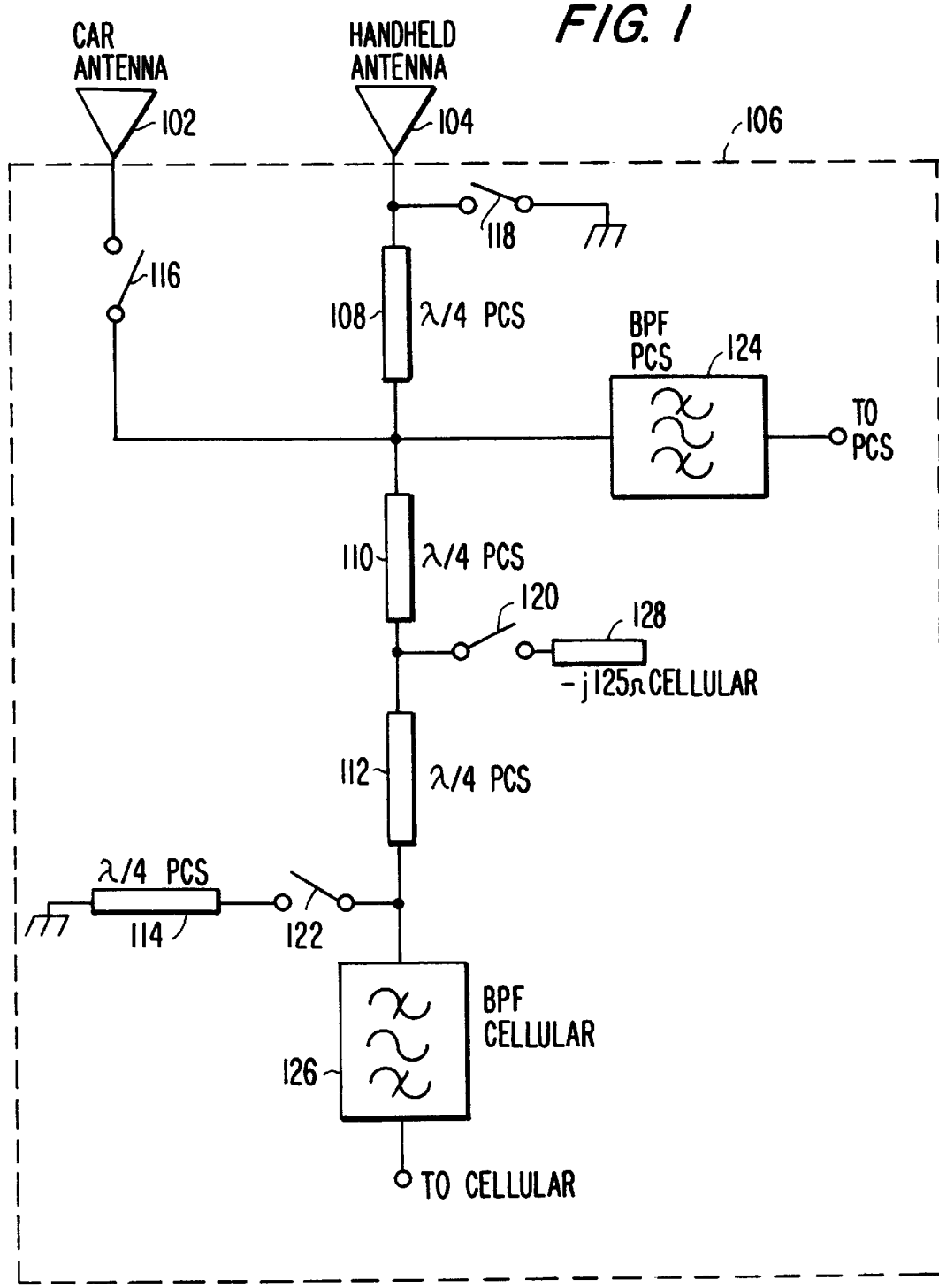
FIG. 1 is a high-level block diagram of a portable radio transceiver for operating in two modes (handheld and car) at two frequency bands according to the invention.

In order not to detract from the focus of the invention by describing in detail all parts of the wireless telephone, only those elements of the portable radio transceiver that are necessary to understand the invention while emphasizing its novel and unobvious features are shown in the drawing figures. Namely, FIG. 1 is a high-level block diagram of the invention showing a car antenna 102 and a handheld antenna 104 connected to a portable radio transceiver 106 that includes, among other things, four PCS quarter-wave length lines 108, 110, 112, 114; four switches 116, 118, 120, 122; two bandpass filters 124, 126; and a tuning element 128. Following the bandpass filters 124, 126, the cellular or PCS signal is processed by appropriate transceiver circuitry during the signal transmission/reception, as indicated by the legend "To Cellular" and "To PCS" in FIG. 1.

In operation, when the switches 116, 118, 120, 122 all are in the "OFF" (open) position, the RF signal is received from or transmitted to the handheld antenna 104. Namely, during the communications session when the user is either a calling or a called party, the RF signal in the PCS or cellular frequency band is propagated through the PCS bandpass filter 124 or the cellular bandpass filter 126, respectively. The RF signal in the PCS frequency band is unperturbed by the cellular bandpass filter 126 because of the selected length of the PCS quarter-wave length lines 110, 112, and the open circuit presented by this filter in the PCS frequency band. Similarly, the RF signal in the cellular frequency band is unperturbed by the PCS bandpass filter 124 because of the open circuit presented by this filter in the cellular frequency band.

It will be appreciated that no bias current is required in this mode of operation, because the switches (which are assumed to be solid state switches) are open. Therefore, no reduction in the length of talk or standby time occurs during the handheld operation. In addition, no non-linearity is introduced, and the only insertion loss, which is due to the reverse impedance of the switches, is very low.

If all of the switches 116, 118, 120, 122 are in the "ON" (closed) position, the car antenna 102 is used for RF signal transmission/reception, while the signal to/from the handheld antenna 104 is shorted to ground. The bandpass filters 124, 126 function in the same way as in the handheld mode, passing signals in either the PCS or cellular bands.

In the car mode of operation, sufficient bias current is required to satisfy the linearity requirements, as well as to keep the switches closed. Power, however, is readily available from the car battery to supply sufficient current as required by this operation.

Figure 2:
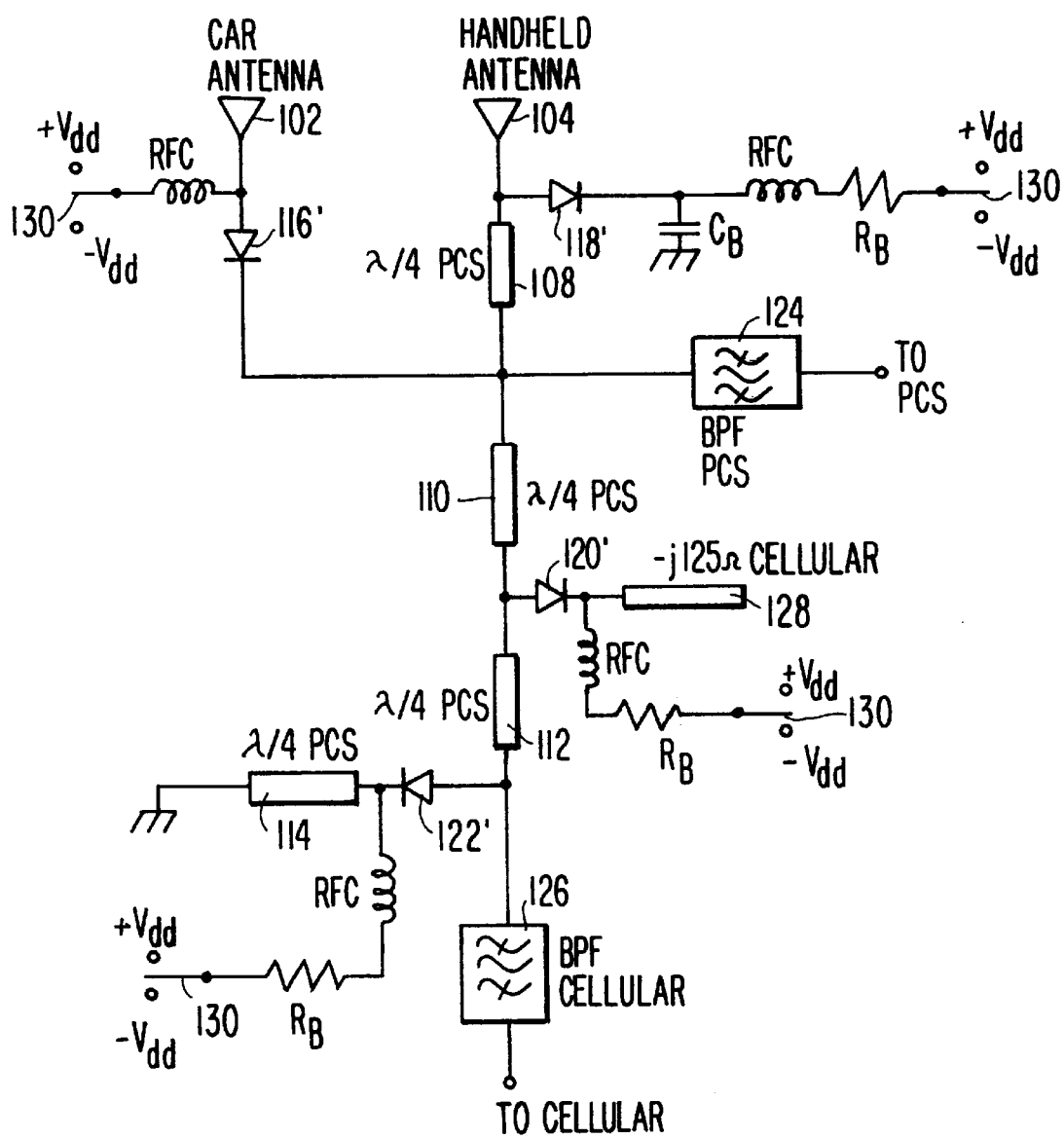
FIG. 2 is a schematic diagram of FIG. 1, illustrating the implementation of switches via PIN diodes according to one aspect of the invention.

The switches 116, 118, 120, 122 may be implemented with PIN diodes that are widely used in RF, UHF and microwave applications, as known by those skilled in the art. When forward biased, these diodes have a very low series resistance for a sufficient bias. FIG. 2 is a representative schematic circuit corresponding to the block diagram of FIG. 1, having the PIN diodes performing the switching function between the car antenna 102 and the handheld antenna 104.

As shown in FIG. 2, PIN diodes 116', 118', 120', 122' function as the switches 116, 118, 120, 122, respectively. Namely, when the diodes are reverse biased using a power source 130, practically no current flows through them, whereby the diodes act as open switches. Alternatively, when the power source 130 forward biases the PIN diodes 116', 118', 120', 122', minimum resistance is encountered by the current flowing therethrough, whereby the function of the closed switch is approximated.

It is understood, of course, that although not shown, the schematic diagram of FIG. 2 according to the invention may include additional capacitors, inductors (RF chokes), and resistors. The selection of these electrical components, as required for proper operation of the circuit, is well within the ordinary level of one skilled in this art.

Figure 3A:
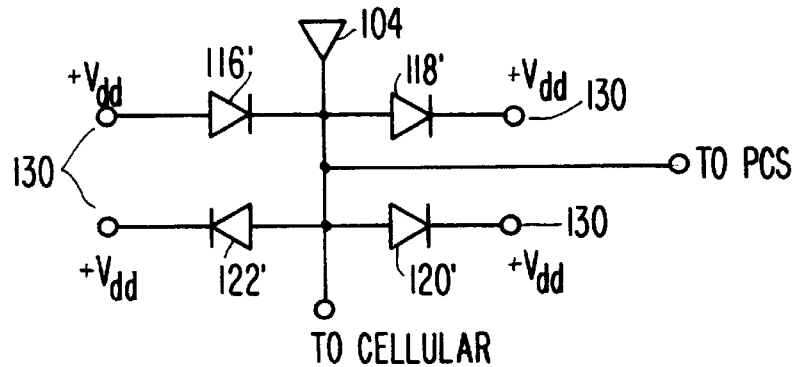
FIG. 3A is a DC diagram of the transceiver during its handheld mode of operation that is implemented with PIN diodes.

FIG. 3A shows a DC diagram for the handheld operation according to the invention that is implemented with the PIN diodes, i.e., when the switches 116, 118, 120, 122 are open. The PIN diodes 116', 118', 120', 122' are reverse biased if the power source 130 supplies, for example, $-V_{dd}$ voltage to the PIN diode 116', and $+V_{dd}$ voltage to the PIN diodes 118', 120', 122' as illustrated in FIG. 3A.

Figure 3B:
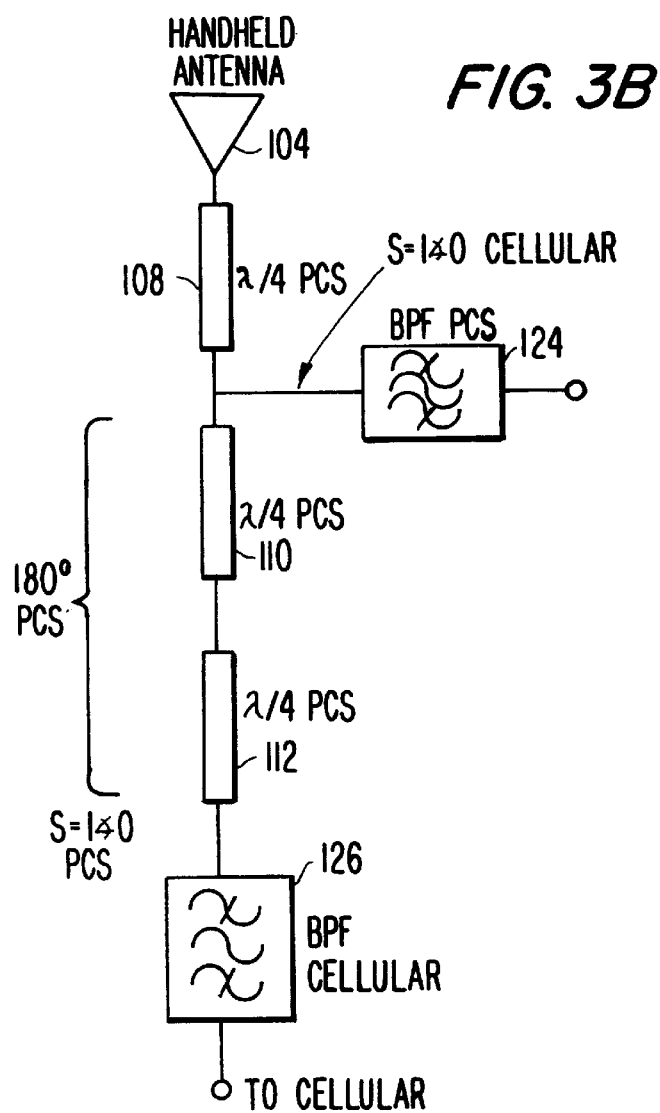
FIG. 3B is a corresponding RF diagram for the handheld mode of operation.

FIG. 3B is an RF diagram for the handheld operation of the wireless phone. The bandpass filters 124, 126 are selected such that their respective input reflection coefficients outside the frequency band of interest (cellular or PCS) have the magnitude 1 and phase 0. That is, the PCS bandpass filter 124, tuned to the PCS frequency band, behaves like an open circuit at the cellular frequency band. Similarly, the cellular bandpass filter 126, tuned to the cellular frequency band, behaves like an open circuit at the PCS frequency band. This total signal reflectivity outside the desired passband of the cellular bandpass filter 126 provides maximum power transfer to the desired PCS load, ensuring that during the handheld operation, the transmission line leading to the cellular bandpass filter 126 (tuned to the cellular frequency band) does not load the PCS signal coming from the handheld antenna 104.

As known in the art, a quarter-wave length line is selected for a particular frequency, resulting in a phase difference of 90 degrees between the input and output of that quarter-wave length line. As illustrated in FIG. 3B, the PCS quarter-wave length lines 110, 112 at the PCS frequency band are combined to provide a 180 degree phase difference between the RF signal entering the PCS quarter-wave length line 110 and the RF signal exiting the PCS quarter-wave length line 112 during the receive operation. It is understood, of course, that during the transmit operation, the RF signal travels in the opposite direction from the receive operation, while still maintaining the 180 degree phase difference between the input and output of the PCS quarter-wave length lines 110, 112. Among other things, this arrangement provides the open circuit equivalent required for the maximum power transfer, as mentioned above.

Figure 4A:
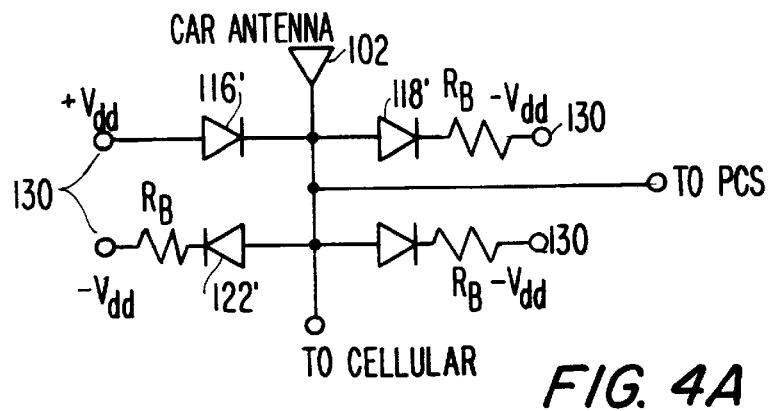
FIG. 4A is a DC diagram of the transceiver during its car mode of operation that is implemented with PIN diodes.

FIG. 4A shows a DC diagram for the car operation in accordance with the invention that is implemented with the PIN diodes, i.e., when the switches 116, 118, 120, 122 are closed. If the power source 130 supplies, for example, $+V_{dd}$ voltage to the PIN diode 116', and $-V_{dd}$ voltage to the PIN diodes 118', 120', 122', the PIN diodes 116', 118', 120', 122' are forward biased as illustrated in FIG. 4A.

Figure 4B:
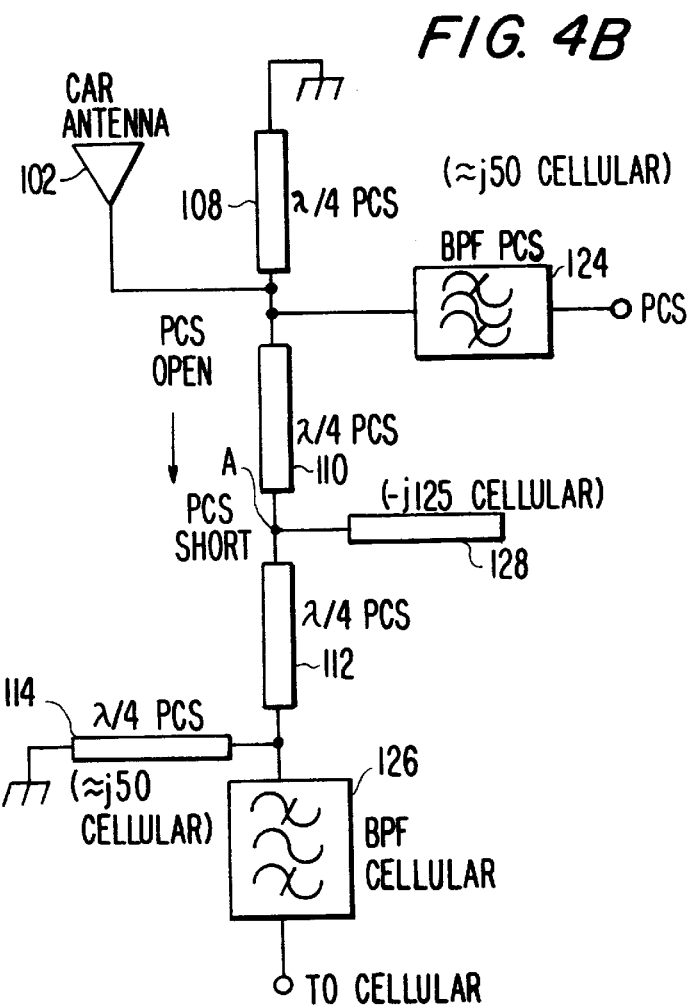
FIG. 4B is a corresponding RF diagram for the car mode of operation.

An RF diagram of the transceiver for the car operation is shown in FIG. 4B illustrating that the RF signals arriving to/from the handheld antenna 104 are shorted to ground via the PIN diode 118'. Moreover, as a result of the quarter-wave length line 108, the RF signals in the PCS frequency band propagate to/from the PCS radio transceiver without any loading from the handheld antenna. Also, the PCS quarter-wave length lines 110, 112 and 114 have a phase length of 270 degrees in the PCS frequency band, and as shown in FIG. 4B, no loading occurs due to: (1) the short circuit at the end of the PCS quarter-wave length line 114; (2) the PCS open circuit at the input of the cellular bandpass filter 126; and (3) the PCS short circuit between the PCS quarter-wave length lines 110 and 112 because of the combined 180 degrees phase length of the PCS quarter-wave length lines 112 and 114.

FIG. 4B shows that the shorted PCS lines (i.e., the PCS quarter-wave length lines 108 and 114) have a substantially purely reactive impedance of approximately 50 ohms in the cellular frequency band. These lines appear as inductive stubs at the cellular frequencies and interfere with the signal transmission at those frequencies. To compensate (tune out) the inductive stubs, a matching circuit with a tuning element at location A is provided for insuring undisturbed signal transmission.

FIG. 5A shows the RF signal phase block diagram of the matching circuit which is a two-stage π-network. The input impedance of the car antenna 102 and the cellular bandpass filter 126 (in the cellular frequency band) is approximately 50 ohms each, while the quarter-wave length lines 108, 110, 112 and 114 are less than 90 degrees in electrical length in the cellular frequency band. To insure maximum power transfer in the cellular frequency band, the tuning element 128 (capacitive stub) is placed between the quarter-wave length lines 110 and 112, as shown in FIG. 5A. The lumped element equivalent of the tuning element 128 is illustrated in the circuit schematic of FIG. 5B, which shows the element values of the matching network required for the maximum power transfer for the RF signals at cellular frequencies.

It will be appreciated that the tuning element 128 inserted mid-way in the matching circuit does not affect the PCS signals. This is so because at the point of connection (point A in FIG. 4B), a short circuit exists in the PCS frequency band. Hence, due to the symmetrical design of the matching network in accordance with the invention, the tuning element 128 required for the RF signals at the cellular frequency band has no effect on the PCS signal transmission.

Figure 6:
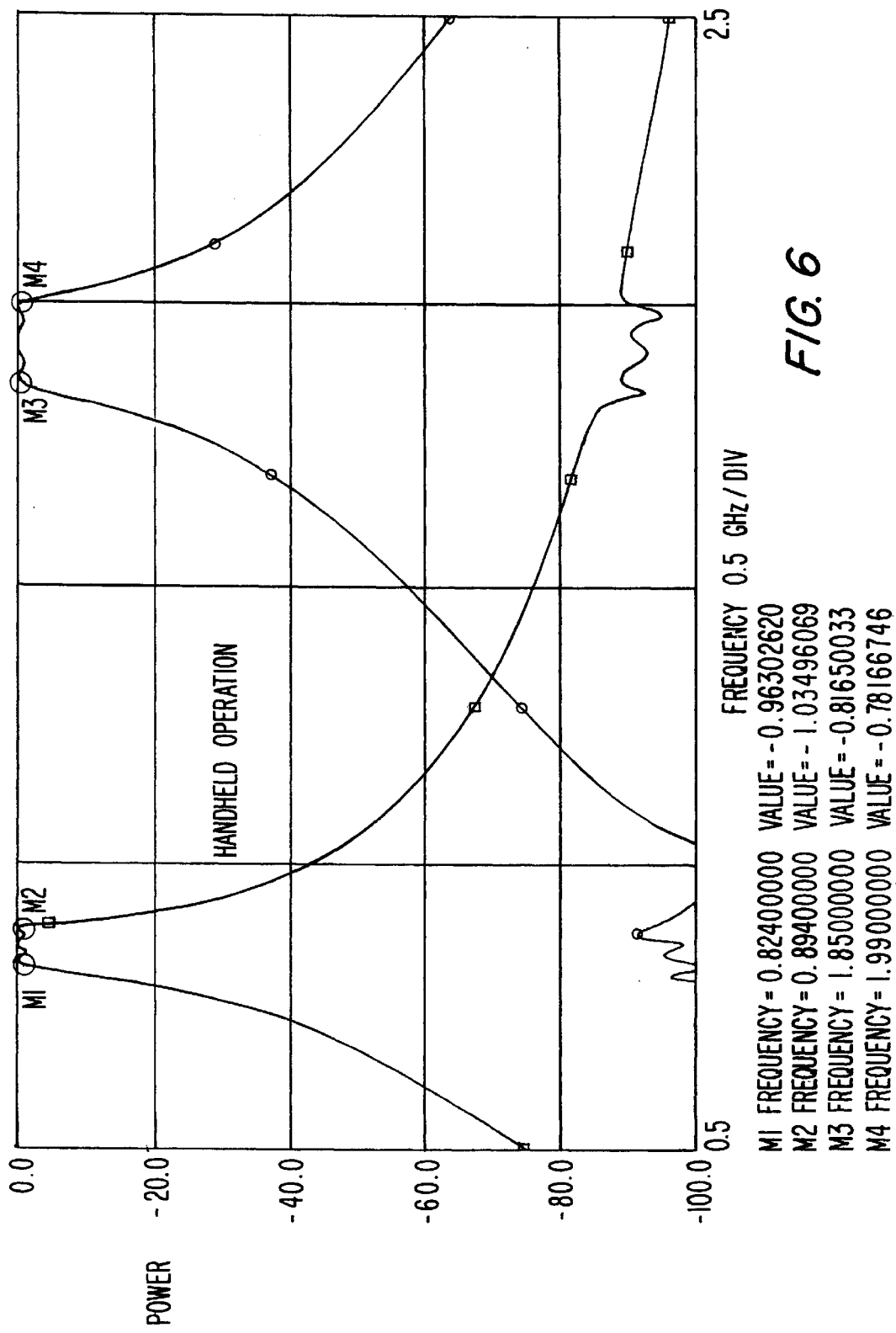
FIG. 6 shows graphs of the RF signal power plotted against cellular and PCS frequency bands for the handheld operation of the invention.
Figure 7:
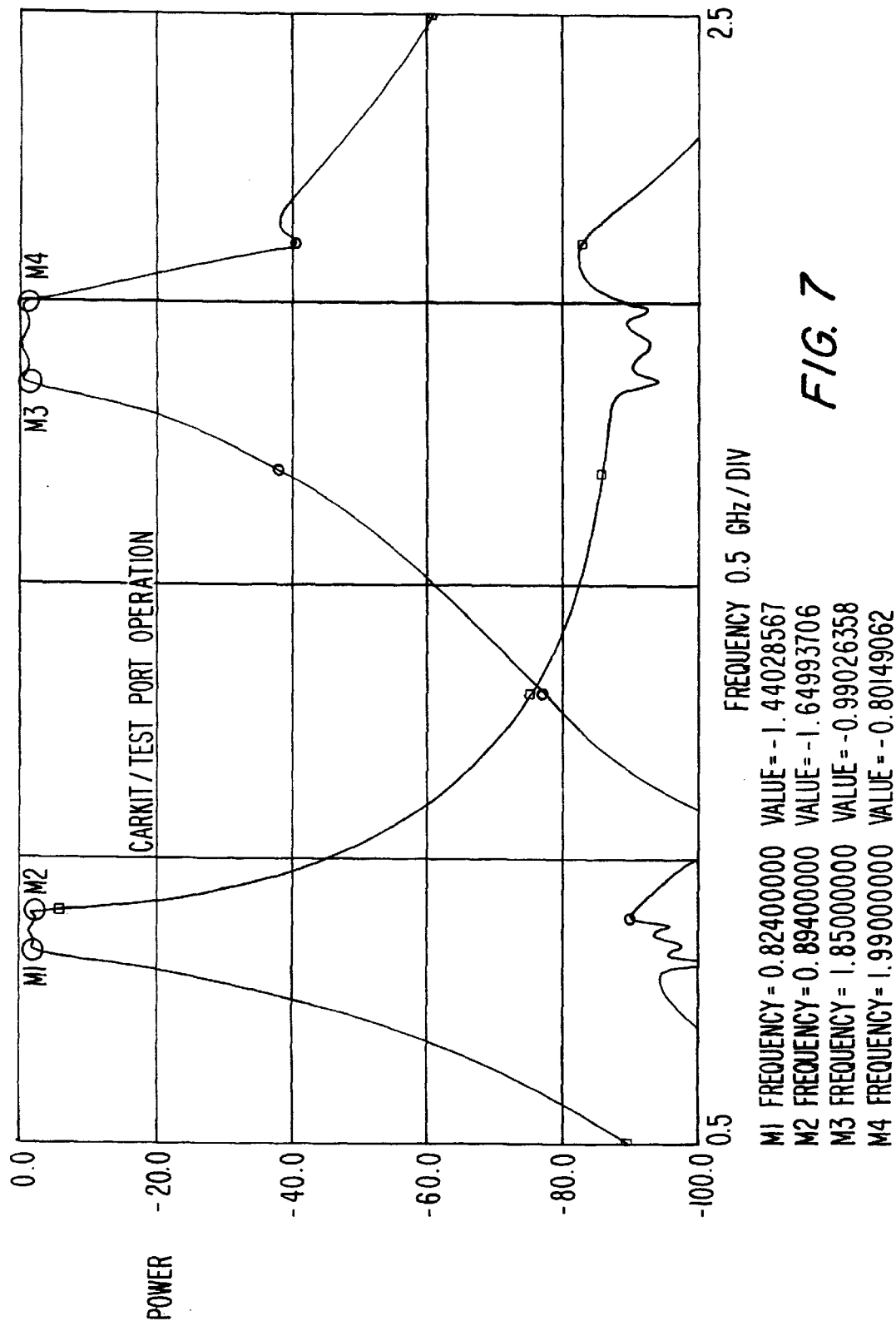
FIG. 7 shows graphs of the RF signal power plotted against cellular and PCS frequency bands for the car operation of the invention.

FIGS. 6 and 7 show graphs of the RF signal power plotted against selected frequencies, such as cellular and PCS frequency bands, during the handheld and car operations, respectively, in accordance with the invention. According to the simulation results in FIG. 6, it is apparent that the RF signal power is only slightly decreased by approximately −1 dB at cellular frequencies M1 (0.824 GHz) and M2 (0.894 GHz). Further, at the PCS frequencies M3 (1.85 GHz) and M4 (1.99 GHz), the RF signal power is also less affected, by approximately −0.8 dB.

Similarly, FIG. 7 shows simulation results during the car antenna operation. It is clear from the plotted graphs that the drop in the RF signal power is negligible in the cellular and PCS frequency bands. Namely, at the M1 (0.824 GHz) and M2 (0.894 GHz) cellular frequencies, the decrease is approximately −1.4 dB and −1.6 dB, respectively. At the M3 (1.85 GHz) and M4 (1.99 GHz) PCS frequencies, the RF power is lowered by approximately −1 dB and −0.8 dB, respectively.

It will be appreciated that any quarter-wave length line, such as 108, 110, 112, 114, can be replaced by a lumped element equivalent circuit (two parallel capacitors in series with an inductor) with the appropriate values for operating at the desired frequencies. Such a discrete element arrangement may be advantageous for miniaturizing the wireless telephone, for example.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A portable radio transceiver for selectively transmitting/receiving radio frequency (RF) signals in a first frequency band or a second frequency band via a first antenna or a second antenna, comprising:

transmission means for carrying said RF signals to/from said first and second antennas;

a plurality of switches for selecting either said first antenna or said second antenna for reception/transmission of said RF signals; and a tuning circuit for selectively adjusting impedance of said transmission means placed between quarter-wave length lines to insure maximum power transfer when said reception/transmission of said RF signals is carried out via said first antenna, said tuning circuit being disconnected from said transmission means by one of said switches if said reception/transmission of said RF signals is carried out via said second antenna such that a bias current is not required.

2. Apparatus according to claim 1, wherein said tuning circuit selectively adjusts said impedance when said RF signals are in said first frequency band, and substantially does not affect said reception/transmission of said RF signals in said second frequency band.

3. Apparatus according to claim 1, further comprising two band pass filters connected to said first and second antennas for selectively passing the transmitted/received RF signals in said first frequency band or said second frequency band, respectively.

4. Apparatus according to claim 3, wherein said first frequency band is allocated for Personal Communications Services, and said second frequency band is allocated for cellular services.

5. Apparatus according to claim 1, wherein said switches are PIN diodes that are forward biased for a substantially short circuit operation and reverse biased for a substantially open circuit operation.

6. Apparatus according to claim 1, wherein said tuning circuit comprises at least one capacitor.

7. Apparatus according to claim 1, wherein said transmission means is a quarter-wave line at said first frequency band.

8. Apparatus according to claim 1, wherein said transmission means is a quarter-wave line equivalent circuit tuned to said first frequency band and comprising two capacitors and an inductor.

9. A method for selectively transmitting/receiving radio frequency (RF) signals in a first frequency band or a second frequency band via a first antenna or a second antenna, comprising the steps of:

carrying said RF signals to/from said first and second antennas via transmission means;

selecting either said first antenna or said second antenna for reception/transmission of said RF signals; and selectively adjusting impedance of said transmission means using a tuning circuit placed between quarter-wave length lines to insure maximum power transfer when said reception/transmission of said RF signals is carried out via said first antenna if said RF signals are in said first frequency band only and being disconnected from said transmission means if said reception/transmission of said RF signals is carried out via said second antenna such that a bias current is not required.

10. The method according to claim 9, further comprising the step of selectively passing the transmitted/received RF signals in said first frequency band or said second frequency band by filtering out frequencies outside said first or second frequency bands, respectively.

11. The method according to claim 9, wherein said first frequency band is allocated for Personal Communications Services, and said second frequency band is allocated for cellular services.

* * * * *